(12) United States Patent
Wang

(10) Patent No.: US 10,353,883 B2
(45) Date of Patent: Jul. 16, 2019

(54) METHOD, DEVICE AND STORAGE MEDIUM FOR PROVIDING DATA STATISTICS

(71) Applicant: TENCENT TECHNOLOGY (SHENZHEN) COMPANY LIMITED, Shenzhen (CN)

(72) Inventor: Cai Ping Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 932 days.

(21) Appl. No.: 14/615,865

(22) Filed: Feb. 6, 2015

(65) Prior Publication Data

US 2015/0178336 A1 Jun. 25, 2015

Related U.S. Application Data

(63) Continuation of application No. PCT/CN2014/082050, filed on Jul. 11, 2014.

(30) Foreign Application Priority Data

Jul. 18, 2013 (CN) .......................... 2013 1 0302711

(51) Int. Cl.
*G06F 16/22* (2019.01)
*G06F 16/2458* (2019.01)
*G06F 17/30* (2006.01)

(52) U.S. Cl.
CPC ...... *G06F 16/2228* (2019.01); *G06F 16/2237* (2019.01); *G06F 16/2465* (2019.01)

(58) Field of Classification Search
CPC ............. G06F 16/2228; G06F 16/2237; G06F 16/2465
See application file for complete search history.

(56) References Cited

U.S. PATENT DOCUMENTS

2003/0212677 A1 11/2003 Chen et al.
2009/0112795 A1 4/2009 Abraham et al.
(Continued)

FOREIGN PATENT DOCUMENTS

CN 101246495 A 8/2008
CN 101883014 A 11/2010
(Continued)

OTHER PUBLICATIONS

The World Intellectual Property Organization (WIPO) International Search Report for PCT/CN2014/082050 dated Oct. 15, 2014 3 Pages.
(Continued)

*Primary Examiner* — Arpan P. Savla
*Assistant Examiner* — Bao G Tran
(74) *Attorney, Agent, or Firm* — Anova Law Group, PLLC

(57) ABSTRACT

The present disclosure relates to a method, a device and a storage medium for providing data statistics in a computer. The method may include: obtaining a data collection from a server, wherein the data collection comprises a plurality of records, and each of the records comprise a target data field; obtaining an index number of each target data field according to the records respectively; obtaining a bitmap comprising a plurality of bitmap units, each bitmap unit having a unique index number; searching and locating a bitmap unit in the bitmap, and writing a predetermined data into the located bitmap unit, wherein the unique index number of the located bitmap unit corresponds to the index number of each target data field; and determining the bitmap unit having a same data with the predetermined data by traversing the bitmap, and counting a total number of the determined bitmap units.

15 Claims, 14 Drawing Sheets

(56) References Cited

U.S. PATENT DOCUMENTS

2010/0332457 A1* 12/2010 Graefe .............. G06F 17/30321
                                                                          707/673
2013/0103713 A1    4/2013  Woodruff et al.
2013/0144882 A1    6/2013  Chen et al.

FOREIGN PATENT DOCUMENTS

| CN | 102043795 A | 5/2011 |
| --- | --- | --- |
| CN | 102073712 A | 5/2011 |
| CN | 102103638 A | 6/2011 |
| CN | 102222085 A | 10/2011 |

OTHER PUBLICATIONS

The State Intellectual Property Office of the People's Republic of China (SIPO) Office Action 1 for 201310302711.X dated Jun. 1, 2018 7 pages (including translation).

* cited by examiner

| 1 | 1 | 0 | 1 | 0 | 0 | 1 | 1 | 1 | 0 | 1 | 1 | 1 | 0 | ...... | 0 | 1 | 1 | 0 | 1 |

FIG. 3

METHOD, DEVICE AND STORAGE MEDIUM FOR PROVIDING DATA STATISTICS

CROSS-REFERENCE

This application is a U.S. continuation application under 35 U.S.C. § 111(a) claiming priority under 35 U.S.C. §§ 120 and 365(c) to International Application No. PCT/CN2014/082050 filed on Jul. 11, 2014, which claims the priority benefit of Chinese Patent Application No. CN 201310302711.X, filed on Jul. 18, 2013, which are hereby incorporated herein by reference in its entirety.

DATA FIELD OF THE INVENTION

The present disclosure relates to data analysis technology, particularly relates to a method, a device and a storage medium for providing data statistics.

BACKGROUND OF THE INVENTION

Analysis of data is a process of inspecting, cleaning, transforming, and modeling data with the goal of discovering useful information, suggesting conclusions, and supporting decision making. During the data analysis, a number of unique values of a set of values is often required to be estimated. For example, a server of a network application often needs to estimate a number of user accounts (userId) of the network application. When estimating the number of user accounts, the user accounts are analyzed as unique values.

Conventional methods for estimating a number of unique values is using high-level language programs, such as Java, C++, and Python, written in a way to count the number of the unique values. For example, set objects of the high-level language programs can be used to store user accounts for various network applications. The number of unique values (user accounts) can be obtained by getting a size of the set object. One example of the high-level language program for counting the number of the user accounts may include following codes (hereafter called HashSet method):

```
HashSet<String> set = new HashSet<String>( );
while(...){
String userId = xxx;
set.add(xxx);
}
return set.size( ).
```

The conventional method for estimating the number of unique values is simple, because it needs less code and is easy to be understood. However, in massive data analysis, for example, in many SNS (social network service) applications, the number of the user accounts is a massive data. Therefore, in the course of the program running, the set object in the above code will consume too much memory, so as to cause a memory overflow problem.

SUMMARY OF THE INVENTION

The present disclosure is to provide a method, a device and a storage medium for providing data statistics in a computer, which has less memory consumption and high efficiency.

Technical solutions provided by embodiments of the present disclosure include:

A method for providing data statistics in a computer is provided, the computer including a processor operating in conjunction with a memory. The method may include: obtaining a data collection from a server, wherein the data collection comprises a plurality of records, and each of the records comprise a target data field; obtaining an index number of each target data field according to the records respectively; obtaining a bitmap comprising a plurality of bitmap units, each bitmap unit having a unique index number; searching and locating a bitmap unit in the bitmap, and writing a predetermined data into the located bitmap unit, wherein the unique index number of the located bitmap unit corresponds to the index number of each target data field; and determining the bitmap unit having a same data with the predetermined data by traversing the bitmap, and counting a total number of the determined bitmap units.

A device for providing data statistics in a computer is provided, the device including a processor operating in conjunction with a memory and a plurality of modules. The plurality of modules may include: a first obtaining module, configured to obtain a data collection from a server, wherein the data collection comprises a plurality of records, and each of the records comprise a target data field; a second obtaining module, configured to obtain an index number of each target data field according to the records respectively; a third obtaining module, configured to obtain a bitmap comprising a plurality of bitmap units, each bitmap unit having a unique index number; a writing module, configured to search and locate a bitmap unit in the bitmap, and write a predetermined data into the located bitmap unit, wherein the unique index number of the located bitmap unit corresponds to the index number of each target data field; and a statistics module, configured to determine the bitmap unit having a same data with the predetermined data by traversing the bitmap, and count a total number of the determined bitmap units.

A computer-readable storage medium storing instructions for providing data statistics in a computer is provided, the computer including a processor operating in conjunction with a memory. The instructions including: obtaining a data collection from a server, wherein the data collection comprises a plurality of records, and each of the records comprise a target data field; obtaining an index number of each target data field according to the records respectively; obtaining a bitmap comprising a plurality of bitmap units, each bitmap unit having a unique index number; searching and locating a bitmap unit in the bitmap, and writing a predetermined data into the located bitmap unit, wherein the unique index number of the located bitmap unit corresponds to the index number of each target data field; and determining the bitmap unit having a same data with the predetermined data by traversing the bitmap, and counting a total number of the determined bitmap units.

In various embodiments of the present disclosure, by writing a predetermined value into the located bitmap unit, determining the bitmap unit having a same data with the predetermined data by traversing the bitmap, and counting a total number of the determined bitmap units, the number of the unique values of the data collection can be obtained with less memory consumption and high efficiency.

Other features and advantages of the present disclosure will immediately be recognized by persons of ordinary skill in the art with reference to the attached drawings and detailed description of exemplary embodiments as given below.

BRIEF DESCRIPTION OF THE DRAWINGS

FIG. 3 is a schematic illustration of a bit sequence of a bitmap in accordance with the method of FIG. 2.

DETAILED DESCRIPTION OF PREFERRED EMBODIMENTS

The embodiment of the present invention can be implemented in numerous ways, including as a process, a device, a system, a computer-readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configure to perform a task may be implemented as a general component that is temporarily configured to perform the task at a given time or a specific component that is manufactured to perform, the task. As used herein, the term 'processor' refers to one or more devices, circuits, and/or processing cores configured to process data, such as computer program instructions.

Various embodiments of the disclosure are discussed in detail below. While specific implementations are discussed, it should be understood that this is done for illustration purposes only. A person skilled in the art will recognize that other components and configurations may be used without parting from the spirit and scope of the disclosure.

The present disclosure provides a method, a device and a storage medium for providing data statistics in a computer.

The computer in the present disclosure, such as a personal computer or a server, may install/run one or more operating system inside.

Figure 1:
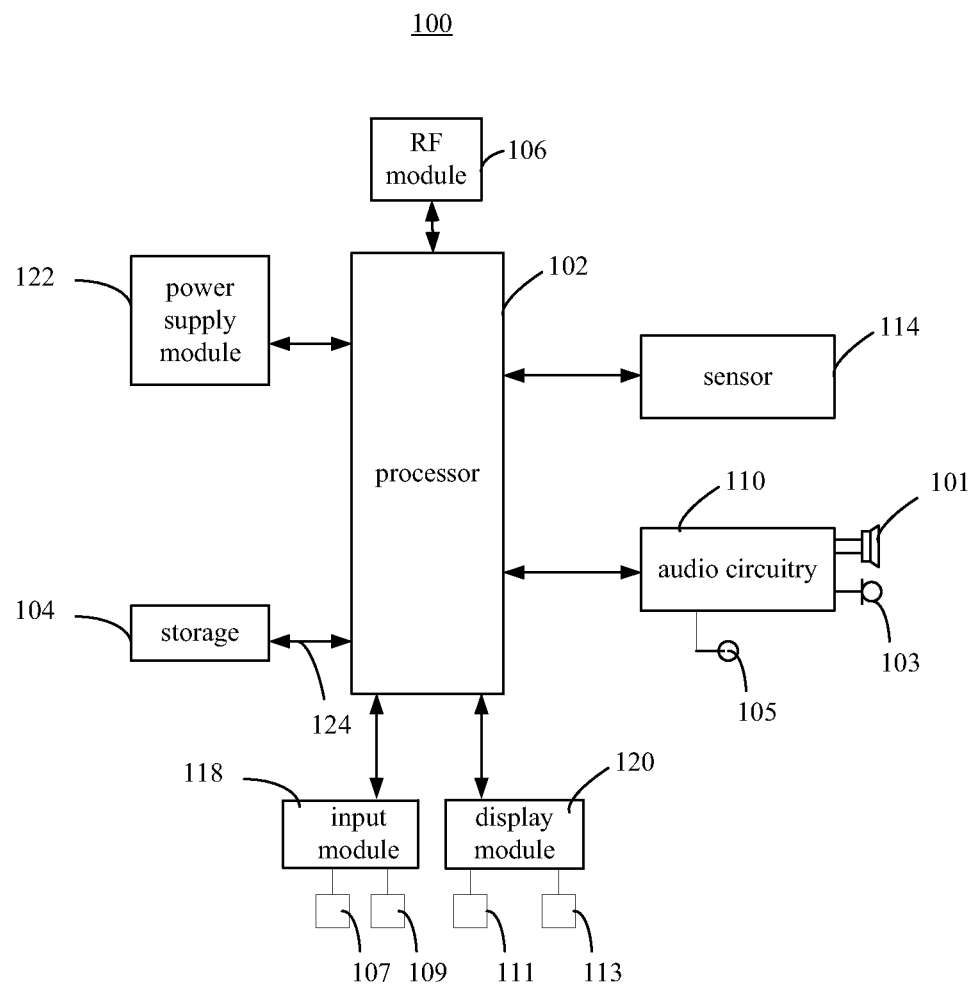
FIG. 1 is a block diagram of an embodiment of a computer for performing the method provided by various embodiments of the present disclosure.

FIG. 1 illustrates a computer embodiment in the present disclosure. Referring to FIG. 1, the computer 100 includes one or more (only one in FIG. 1) processors 102, a memory 104, a Radio Frequency (RF) module 106, an audio circuitry 110, a sensor 114, an input module 118, a display module 120, and a power supply module 122. A person skilled in the art will understand that the structure in FIG. 1 is shown for illustration purposes only, not limitations of the computer 100. For example, the computer 100 may also include more or less parts than FIG. 1 shows, or different configuration.

It can be understood by those skilled in the art that besides the processor 102, all other components are belong to peripheral. The processor 102 and the peripherals are coupled by many peripheral interfaces 124. Peripheral interfaces 124 may be implemented based on the following standards: Universal Asynchronous Receiver/Transmitter (UART), General Purpose Input Output (GPIO), Serial Peripheral Interface (SPI), Inter-Integrated Circuit (I2C), but not limited to the above standards. In some examples, the peripheral interfaces 124 may only include the bus; while in other examples, the peripheral interfaces 124 may also include other components, one or more controllers, for example, which may be a display controller for connecting a liquid crystal display panel or a storage controller for connecting storage. In addition, these controllers may also be separated from the peripheral interface 124, and integrated inside the processor 102 or the corresponding peripheral.

The memory 104 may be used to store software programs and modules, such as the program instructions/modules corresponding to the method and device for providing data statistics in a computer in the various embodiments of the present disclosure. The processor 102 performs a variety of functions and data processing by running the software program and the module stored in the memory 104, which implements the above method for providing data statistics in a computer in the various embodiments of the present disclosure. Memory 104 may include high-speed random access memory and nonvolatile memory, such as one or more magnetic storage devices, flash memory, or other non-volatile solid-state memory. In some examples, the memory 104 may further include a remote configured memory compared to the processor 102, which may be connected to the computer 100 via the network. The network instances include but not limited to, the Internet, intranets, local area network, mobile communication network, and their combinations.

The RF module 106 is used for receiving and transmitting electromagnetic waves, implementing the conversion between electromagnetic waves and electronic signals, and communicating with the communication network or other devices. The RF module 106 may include a variety of existing circuit elements, which perform functions, such as antennas, RF transceivers, digital signal processors, encryption/decryption chips, the subscriber identity module (SIM) card, memory, etc. The RF module 106 can communicate with a variety of networks such as the Internet, intranets, wireless network and communicate to other devices via wireless network. The above wireless network may include a cellular telephone network, wireless local area network (LAN) or metropolitan area network (MAN). The above wireless network can use a variety of communications standards, protocols and technologies, including but not limited to Global System for Mobile Communication (GSM), Enhanced Data GSM Environment (EDGE), wideband code division multiple access (W-CDMA), Code division access (CDMA), time division multiple access (TDMA), Wireless, Fidelity (WiFi) (such as the American Institute of Electrical and Electronics Engineers Association standards IEEE 802.11a, IEEE 802.11b, IEEE802.11g, and/or IEEE 802.11n), Voice over internet protocol (VoIP), Worldwide Interoperability for Microwave Access (Wi-Max), other protocols used for mail, instant messaging and short message, as well as any other suitable communication protocol, even including the protocols which are not yet been developed currently.

The Audio circuitry 110, the speaker 101, the audio jack 103, the microphone 105 together provide the audio interface between the user and the electronic device 100. Specifically, the audio circuit 110 receives audio data from the processor 102, converts the audio data into an electrical signal, and transmits the signal to the speaker 101. The speaker 101 converts the electrical signals to sound waves which can be heard by human ears. The audio circuitry 110 also receives electronic signals from the microphone, converts electronic signals to audio data, and transmits the audio data to the processor 102 for further processing. The audio data may also be acquired from the memory 104 or the RF module 106. In addition, the audio data may also be stored in the memory 104 or transmitted by the RF module 106 and the transmission module 108.

Examples of sensor 114 include but not limited to: an optical sensor, an operating sensor, and other sensors. Specifically, the optical sensor may include an ambient light sensor and a proximity sensor. The ambient light sensor may sense ambient light and shade, and then some modules executed by the processor 102 may use the output of the ambient light sensor to automatically adjust the display output. The proximity sensor may turn off the display output when detect the electronic device 100 near the ear. As a kind of motion sensor, gravity sensor may detect the value of acceleration in each direction, and the value and direction of gravity when the gravity sensor keeps still, which can be used for applications to identify the phone posture (such as horizontal and vertical screen switching, related games, magnetometer posture calibration), and for vibration recognition related functions (such as pedometer, percussion), etc. The electronic device 100 may also include a gyroscope, a barometer, a hygrometer, a thermometer, and other sensors, which is not shown for the purpose of brevity.

The input unit 118 may be configured to receive the input character information, and to generate input by keyboard, mouse, joystick, optical or trackball signal related to user settings and function control. Specifically, the input module 118 may include button 107 and touch surface 109. The buttons 107 for example, may include character buttons for inputting characters, and control buttons for triggering control function. The instances of the control buttons may include a "back to the main screen" button, a power on/off button, a camera button and so on. The touch surface 109 may collect user operation on or near it (for example, a user uses a finger, a stylus, and any other suitable object or attachment to operate on or near the touch surface 109), and drive the corresponding connecting device according to pre-defined program. Optionally, the touch surface 109 may include a touch detection device and a touch controller. The touch detection device detects users' touch position and a signal produced by the touch operation, and passes the signal to the touch controller. The touch controller receives touch information from the touch detection device, converts the touch information into contact coordinates, sends the contact coordinates to the processor 102, and receives and executes commands sent from the processor 102. In addition, the touch surface 109 may be implemented in resistive, capacitive, infrared, surface acoustic wave and other forms. Besides the touch surface 109, the input unit 118 may also include other input devices. The preceding other input devices include but not limited to, one or more physical keyboards, trackballs, mouse, joysticks, etc.

The display module 120 is configured to display the information input by users, the information provided to users, and a variety of graphical user interfaces of the electronic device 100. The graphical user interfaces may consist of graphics, text, icons, video, and any combination of them. In one example, the display module 120 includes a display panel 111. The display panel 111 may for example be a Liquid Crystal Display (LCD) panel, an Organic Light-Emitting Diode Display (OLED) panel, an Electro-Phoretic Display (EPD) panel and so on. Furthermore, the touch surface 109 may be on top of the display panel 111 as a whole. In other embodiments, the display module 120 may also include other types of display devices, such as a projection display device 113. Compared with the general display panel, the projection display device 113 needs to include a plurality of components for projection, such as a lens group.

The power supply module 122 is used to provide power for the processor 102 and other components. Specifically, the power supply module 122 may include a power management system, one or more power supplies (such as a battery or AC), a charging circuit, a power failure detection circuit, an inverter, a power status indicator, and any other components related to electricity generation, management and distribution within the electronic device 100.

Figure 2:
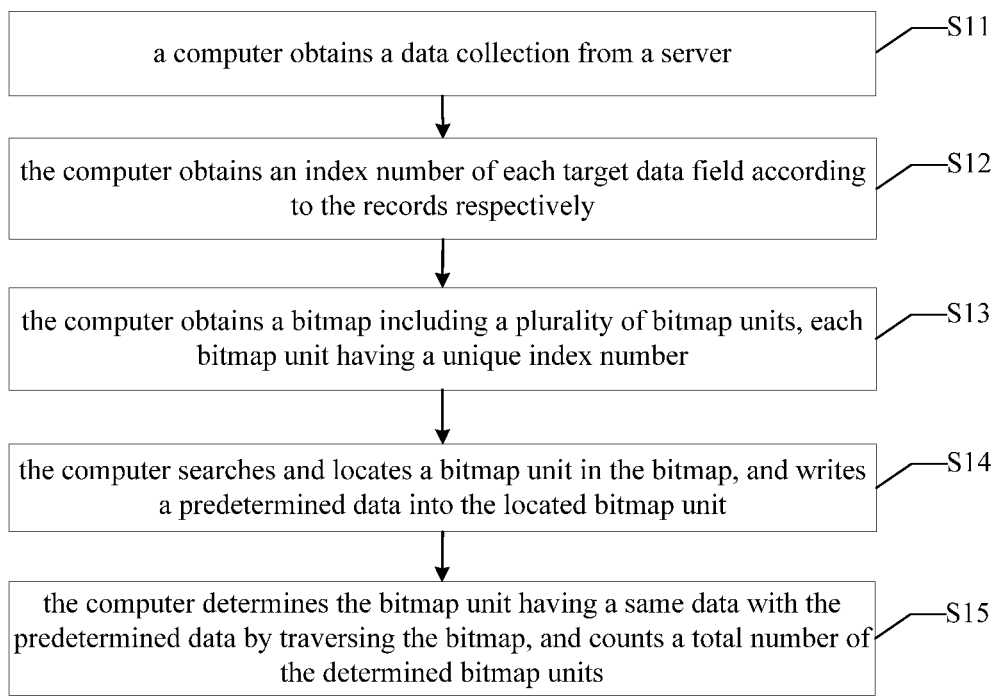
FIG. 2 is a flow chart of a method for providing data statistics in a computer provided by one embodiment of the present disclosure.

Referring to FIG. 2, which is a flow chart of a method for providing data statistics in a computer provided by one embodiment of the present disclosure. The method (hereafter called a bitmap method) includes the following steps.

In Step 11, the computer obtains a data collection from a server.

The data collection obtained by the computer is a data collection needs to be statics. The data collection may include a plurality of records. Each of the records may include a target data field. The target data fields may take many forms, such as user account, email address, IP address, machine physical address, etc. The target data fields may have different data types including unsigned integer, characters, floating-point numbers, alphanumeric strings, etc.

In an exemplary embodiment, the data collection can be obtained from operation logs of an SNS application stored on cloud servers. According to statistical purposes, the cloud server can extract records having the target data fields from the operation logs, and integrate the records containing the target data fields into the data collection. For example, if the statistical purpose is to count how many users landing the SNS application in a specified day according to user accounts, the cloud server may extracted the records containing user accounts from the operation logs of all users who landing the SNS application in the specific day, and integrate the records into the data collection. In this example, the target data field is user accounts of all users who landing the SNS application in the specific day.

In Step 12, the computer obtains an index number of each target data field according to the records respectively.

For example, if the target data field is a user account, and the user account is an unsigned integer type account, the user account itself can be directly used as the index number of the target data field.

In Step 13, the computer obtains a bitmap including a plurality of bitmap units, each bitmap unit having a unique index number.

Figure 3:
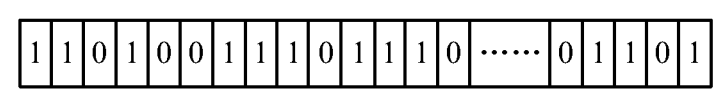

The bitmap refers to a bit sequence in the memory, as shown in FIG. 3. One bitmap may include a plurality of bitmap units. Each bitmap unit may include only one bit or a number of consecutive bits. The bit in the bitmap can be set to be zero (0) or one (1). It can be understood that, based on the principle of binary, one bitmap unit can record $2^K$ types value (or state), where K is a number of bits in the bitmap unit. For example, if a bitmap unit B1 includes only one bit, the bitmap unit B1 can record two types value: 0 or 1.

In this embodiment, the step of obtaining the bitmap may include creating a bitmap. A total number of the bitmap units in the bitmap are equal to or greater than a maximum possible number of the value of the target data field. Assuming the target data field is a 4-byte unsigned integer, the maximum possible number of the value of the 4-byte unsigned integer is 4294967196, therefore, the bitmap should include at least 4294967196 bitmap units.

In Step 14, the computer searches and locates a bitmap unit in the bitmap, and writes a predetermined data into the located bitmap unit, wherein the unique index number of the located bitmap unit corresponds to the index number of each target data field.

Distance between each two adjacent bitmap units can be defined as 1. A distance between each bitmap unit and a first bitmap unit of the bitmap (the bitmap unit at the beginning of the bitmap) can be defined as an index number of each bitmap unit. For example, if a distance between a bitmap unit B10 and the first bitmap unit B0 is 10, the index number of the bitmap unit B10 is 10.

An address of each bitmap unit can be calculated according to an address of the first bitmap unit. Specifically, if an address of the first bitmap unit is $S_0$, the address of a bitmap unit can be calculated by following formula:

$$S=S_0+a*n. \quad (1)$$

In formula (1), a is the index number of the bitmap unit, n is the number of bits in the bitmap unit. If the bitmap unit only contains one bit, the address of the bitmap unit can be simplified to $S=S_0+a$.

The unique index number of the located bitmap unit corresponds to the index number of each target data field. In the exemplary embodiment, the unique index number of the located bitmap unit may be same with the index number of one of the target data fields. Therefore, the predetermined value may be written directly into the located bitmap units by bit operating, after calculating the address of the located bitmap unit by the formula (1) mentioned above.

In the exemplary embodiment, one (1) or zero (0) is used as the predetermined value to imply a target data field is observed. It should be noted that, if using zero to imply the target data field is observed, before using the bitmap, all of the bits in the bitmap units of the bitmap need to be set to one. When a bitmap unit having a unique index number same with the index number of one of target data fields is located, a predetermined value zero is written into the located bitmap unit. If using the one to imply the target data field is observed, before using the bitmap, all of the bits in the bitmap units of the bitmap need to be set to zero. When a bitmap unit having a unique index number same with the index number of one of target data fields is located, a predetermined value one is written into the located bitmap unit.

In Step 15, the computer determines the bitmap unit having a same data with the predetermined data by traversing the bitmap, and counts a total number of the determined bitmap units.

No matter how many records having a same index number with the target data field, only one bitmap unit corresponds to the these records, and the predetermined value written therein each time is a same value, therefore, by traversing the bitmap and determining the bitmap unit having a same data with the predetermined data, the number of unique value can be statistic quickly and efficiently.

In the embodiment of the present disclosure, by writing a predetermined value into the located bitmap unit, determining the bitmap unit having a same data with the predetermined data by traversing the bitmap, and counting a total number of the determined bitmap units, the number of the unique values of the data collection can be obtained with less memory consumption and high efficiency.

Figure 4:
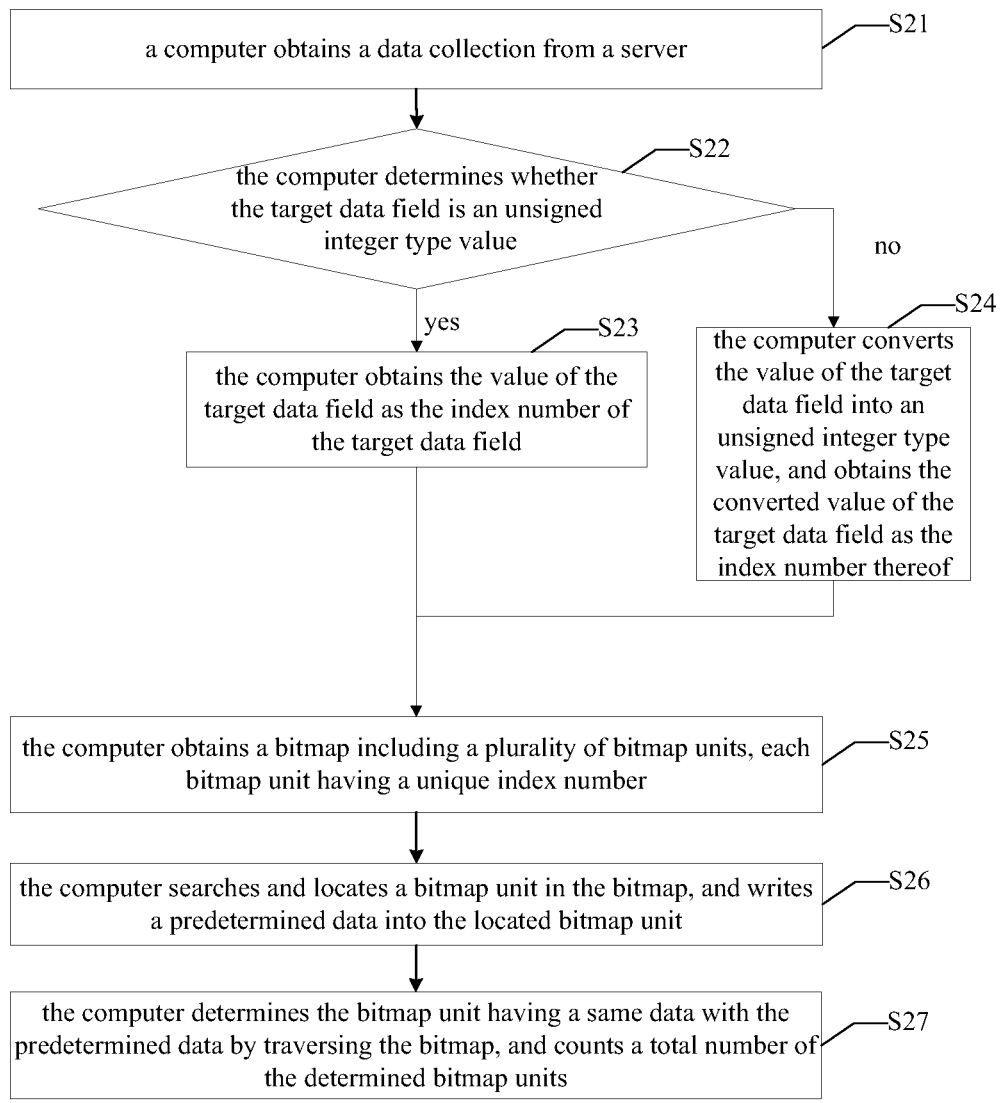
FIG. 4 is a flow chart of a method for providing data statistics in a computer provided by another embodiment of the present disclosure.

Referring to FIG. 4, which is a flow chart of a method for providing data statistics in a computer provided by another embodiment of the present disclosure. The method includes the following steps:

In Step 21, the computer obtains a data collection from a server, wherein the data collection includes a plurality of records, and each of the records include a target data field.

In Step 22, the computer determines whether the target data field is an unsigned integer type value. If yes, Step 23 is executed, otherwise, Step 24 is executed.

In Step 23, the computer obtains the value of the target data field as the index number of the target data field.

In Step 24, the computer converts the value of the target data field into an unsigned integer type value, and obtains the converted value of the target data field as the index number thereof.

For example, a value of the target data field can be converted into an unsigned integer type value using hash algorithm, and using the resulting unsigned integer value as the index number of the target data field.

It can be understood that, not all of the target data fields are unsigned integers. The target data field may also be string type value, such as a mail address. The value of these string type target data fields cannot be mapped directly to a bitmap, so these string type target data field need to be converted to unsigned integer value first, and then the unsigned integer values are mapped to a bitmap.

In Step 25, the computer obtains a bitmap comprising a plurality of bitmap units, each bitmap unit having a unique index number.

In Step 26, the computer searches and locates a bitmap unit in the bitmap, and writes a predetermined data into the located bitmap unit, wherein the unique index number of the located bitmap unit corresponds to the index number of each target data field.

In Step 27, the computer determines the bitmap unit having a same data with the predetermined data by traversing the bitmap, and counts a total number of the determined bitmap units.

In the embodiment of the present disclosure, by writing a predetermined value into the located bitmap unit, determining the bitmap unit having a same data with the predetermined data by traversing the bitmap, and counting a total number of the determined bitmap units, the number of the unique values of the data collection can be obtained with less memory consumption and high efficiency. Especially, by mapping non unsigned integer values into unsigned integer values, target data field with various types can be statics.

Figure 5:
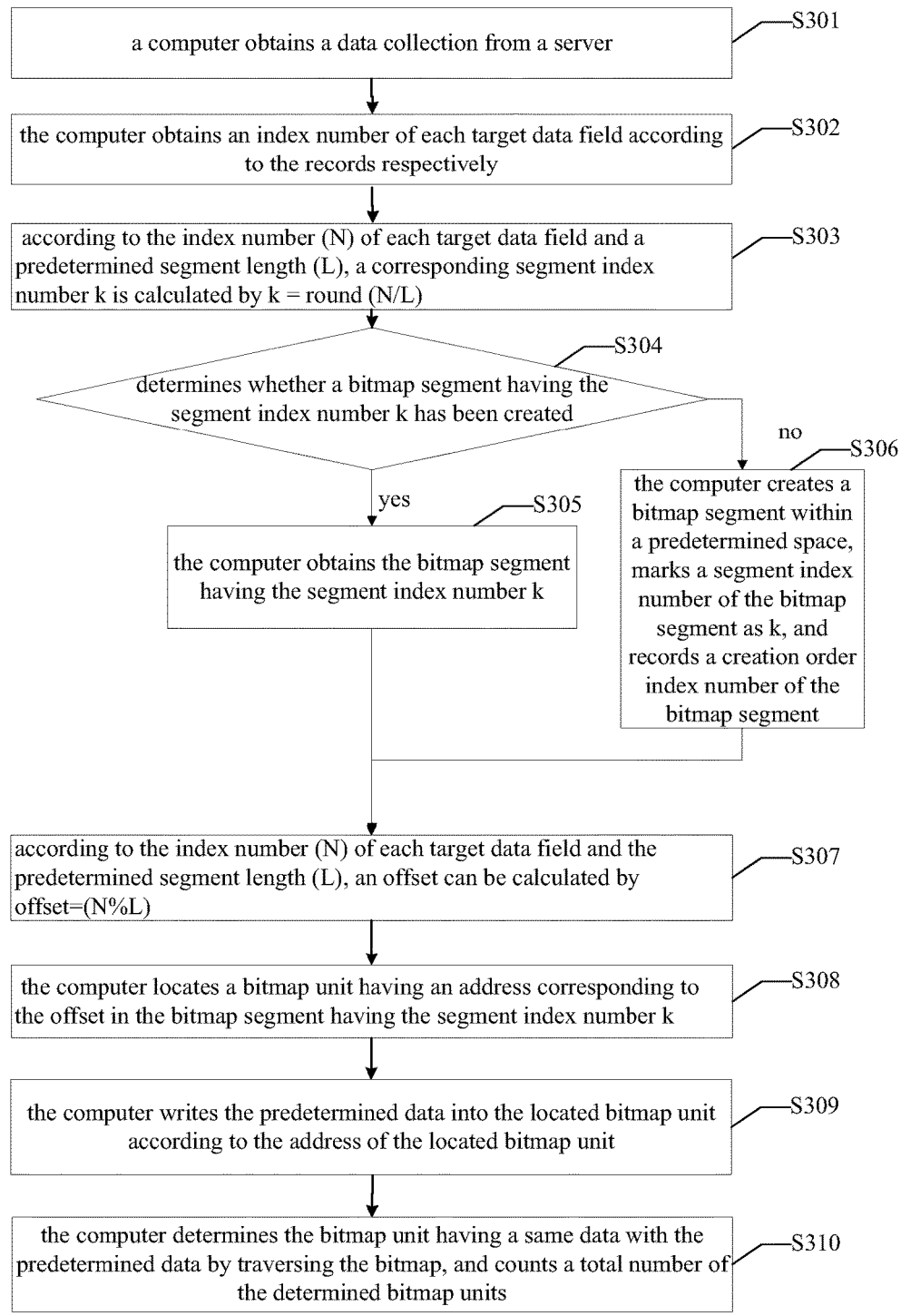
FIG. 5 is a flow chart of a method for providing data statistics in a computer provided by yet another embodiment of the present disclosure.

Referring to FIG. 5, which is a flow chart of a method for providing data statistics in a computer provided by further another embodiment of the present disclosure. The method (hereafter called a bitmap segment method) includes the following steps:

In Step 301, the computer obtains a data collection from a server, wherein the data collection includes a plurality of records, and each of the records include a target data field.

In Step 302, the computer obtains an index number of each target data field according to the records respectively.

In Step 303, according to the index number (N) of each target data field and a predetermined segment length (L), a corresponding segment index number k is calculated by following formula:

$$k=\text{round}(N/L). \quad (2)$$

In Step 304, the computer determines whether a bitmap segment having the segment index number k has been created. If yes, Step 305 is executed, otherwise, Step 306 is executed.

In Step 305, the computer obtains the bitmap segment having the segment index number k.

In Step 306, the computer creates a bitmap segment within a predetermined space, marks a segment index number of the bitmap segment as k, and records a creation order index number of the bitmap segment.

Figure 6:
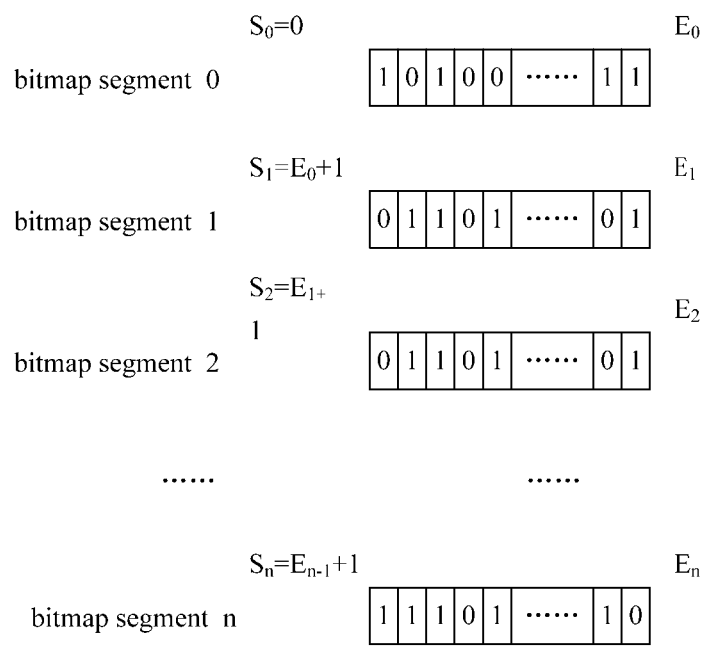
FIG. 6 is a diagram of the bitmap segment in accordance with the method of FIG. 5.

Referring to FIG. 6, a diagram of the bitmap segment created by the above-described method is illustrated. In FIG. 6, the order index numbers of the bitmap segments are sequentially from 0 to n. A length of each bitmap segment is equal to the predetermined segment length L. If the first bitmap segment 0 has a starting address $S_0$ and an ending address $E_0$, the starting address Sn of the bitmap segment n can be calculated by following formula:

$$Sn=E_{n-1}+1=S_0+L*n. \quad (3)$$

Although in the example shown in FIG. 6, the order index number of the bitmap segment starts from 0, it can be understood that the implementation of the embodiment is not limited thereto. For example, the order index number of the first bitmap segment can be started from 1, and the address of each bitmap segment can be calculated by corresponding converting.

In Step 307, according to the index number (N) of each target data field and the predetermined segment length (L), an offset can be calculated by following formula:

$$\text{offset}=(N \% L). \quad (4)$$

In Step 308, the computer locates a bitmap unit having an address corresponding to the offset in the bitmap segment having the segment index number k.

Specifically, computer may calculate an address Sn of the bitmap unit can be calculated by following formula:

$$Sn=(S_0+L*n+\text{offset}). \quad (5)$$

In the formula (5), $S_0$ is a starting address of the predetermined space, n is the creation order index number of the bitmap segment.

In Step 309, the computer writes the predetermined data into the located bitmap unit according to the address of the located bitmap unit.

In Step 310, the computer determines the bitmap unit having a same data with the predetermined data by traversing the bitmap, and counts a total number of the determined bitmap units.

In the embodiment of the present disclosure, by writing a predetermined value into the located bitmap unit, determining the bitmap unit having a same data with the predetermined data by traversing the bitmap, and counting a total number of the determined bitmap units, the number of the unique values of the data collection can be obtained with less memory consumption and high efficiency. Especially, in this embodiment, the bitmap are partitioned into segments. Only when a bitmap segment needs to use, the bitmap segment is created. If the value of the target data field does not cover the bitmap segment, the bitmap segment will not be created, so the memory consumption of overall bitmap can be further reduced. Accordingly, because the space occupied by the bitmap is reduced, the efficiency for traversing the bitmap can be further improved.

Figure 7:
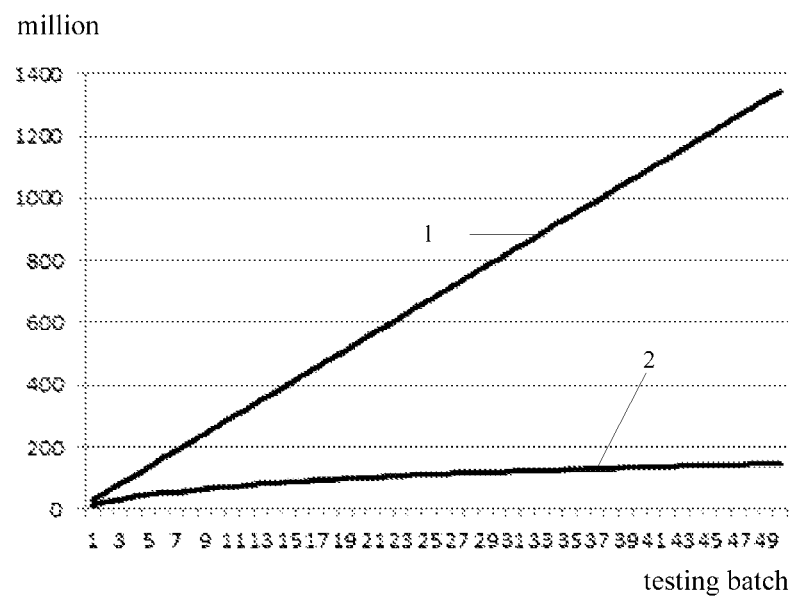
FIG. 7 is a diagram of a test data set in accordance with the embodiments of the present disclosure.

To further illustrate the different efficiency between the method for providing data statistics provided by above mentioned embodiments of the present disclosure and the conventional method described in the BACKGROUND (HashSet method), more than 50 batches of tests are carried out in connection with a SNS operation log having more than 150 billion records. In the 50 batches of tests, the test language is Java, the operating environment is JDK 1.6.0_23, and memory of the test server memory (RAM) is 32G. As shown in FIG. 7, in the 50 batches of tests, the number of the records is varied from approximately 27 million to 1.35 billion, and the number of the user accounts is varied from approximately from 13 million to 1.46 million. Each user account is a 4-byte unsigned integer, so the maximum possible value thereof is 4294967196, and the minimum possible value thereof is 0.

Figure 8:
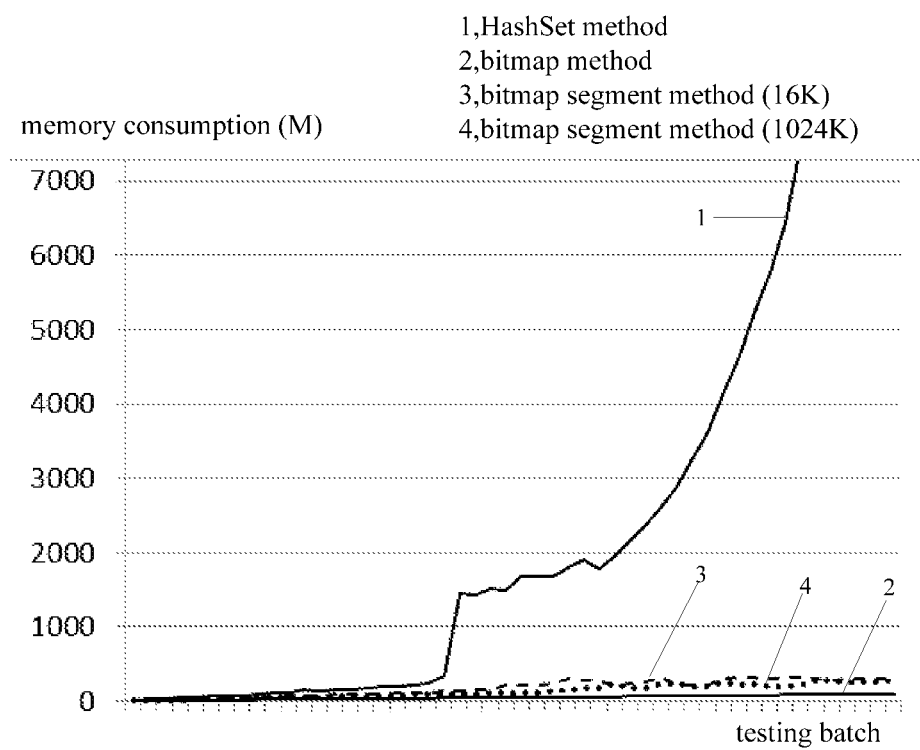
FIG. 8 is a schematic illustration of test results of memory consumption in accordance with the embodiments of the present disclosure and the method in the prior art.
Figure 9:
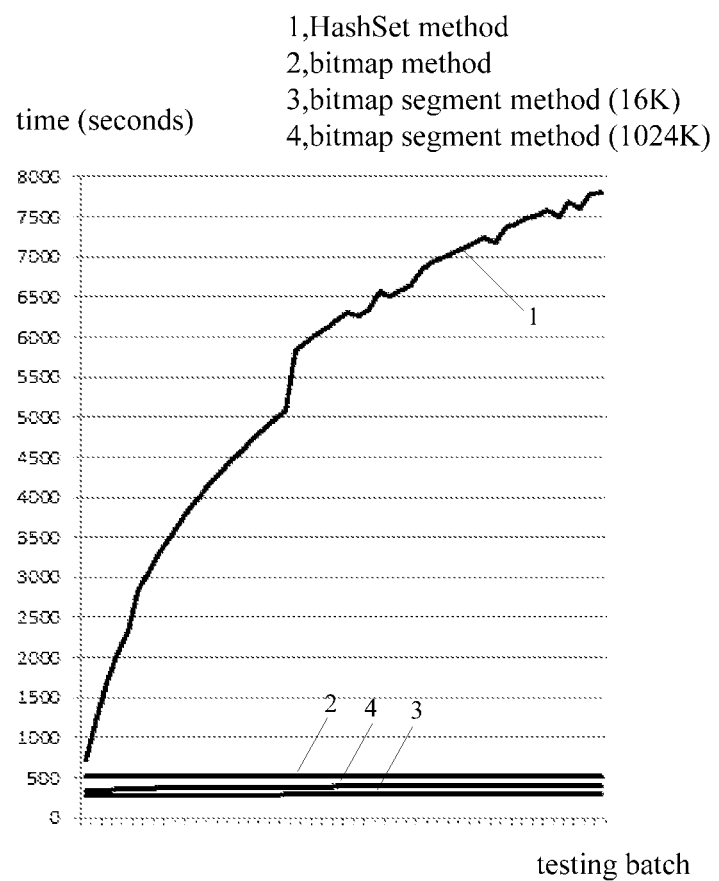
FIG. 9 is a schematic illustration of test results of time in accordance with the embodiments of the present disclosure and the method in the prior art.

Referring to FIGS. 8 and 9, results of the tests include:

1. Calculating a number of user accounts using HashSet method in the BACKGROUND, Java Virtual Machine (JVM) sets the memory pool size parameters (Xmx parameter) to be 8G. When the number of user accounts increases to 13 million, a memory consumption of the HashSet method has reached to 723M, with the number of user accounts increased, the memory consumption has a rapid growth to 7798.2M (when the patch number is 50). The time for counting the number of user accounts is increased from 14.8 seconds to 20935.8 seconds.

2. Calculating a number of user accounts using the bitmap method in the exemplary embodiment, a total length of the bitmap is the maximum possible value of a 4-byte unsigned integer is 4294967196. No matter how many the user accounts there has, a memory consumption of the bitmap method maintains on approximately 512M, and the time for counting the number of user accounts is increased from 12 seconds to 97.6 seconds.

3. Calculating a number of user accounts using a bitmap segment method in the exemplary embodiment:

1). a predetermined segment length is set to 16K, a memory consumption of the bitmap segment method increased from 274.9M to 291.6M, and the time for counting the number of user accounts is increased from 12.2 seconds to 306.7 seconds.

2). a predetermined segment length is set to 1024K, a memory consumption of the bitmap segment method increased from 333.2M to 398.6M, and the time for counting the number of user accounts is increased from 10.6 seconds to 272.2 seconds.

It needs to be mentioned that, a time for traversing the records has been removed from the time for counting the number of user accounts.

It can be concluded from the above results that:

1. The method for providing data statistics in the various embodiments of the present disclosure needs less memory consumption than the HashSet method, especially when there has large numbers of user accounts. That means the methods in the present disclosure may solve the existing problem of memory overflow.

2. In comparison with the bitmap segment method, the bitmap method consumes more memory space, but needed less time for counting the number of user accounts.

3. The size of the bitmap segment affects the efficiency of the bitmap segment method. The size of the bitmap segment is smaller, the memory space saves more, but the corresponding efficiency will be lower. The size of the bitmap segment is greater, the efficiency of the bitmap segment method is closer to the efficiency of the bitmap method, but the memory space is saved on the winning limited. Therefore, in practice, to select the bitmap segment has a size about 1024K can obtain a value of relative balance.

In addition, in the present embodiments, the records are fairly evenly distributed, based on the principle of the bitmap segmentation, if the data is smaller or a concentration of the data is higher, the role of bitmap segment is more significant, especially in the data statistics of a massive data.

Figure 10:
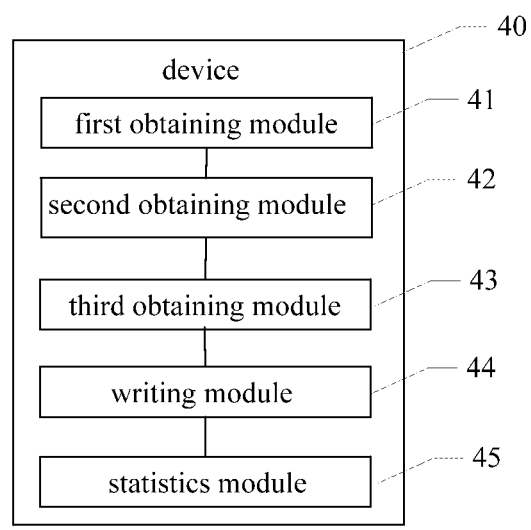
FIG. 10 is a block diagram of a device for providing data statistics in a computer according to one embodiment of the present disclosure.
Figure 11:
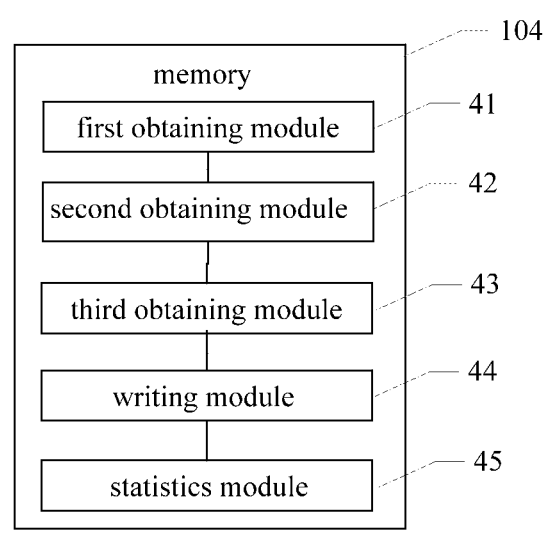
FIG. 11 is a schematic illustration of storage environment of the device illustrated in FIG. 10.

FIG. 10 is a block diagram of a device for providing data statistics in a computer according to one embodiment of the present disclosure. Referring to FIG. 10, the device 40 may include a first obtaining module 41, a second obtaining module 42, a third obtaining module 43, a writing module 44, and a statistics module 45. The first obtaining module 41, the second obtaining module 42, the third obtaining module 43, the writing module 44 and the statistics module 45 may store in the memory 104 of the computer 100, as shown in FIG. 11.

The first obtaining module 41 is configured to obtain a data collection from a server, wherein the data collection comprises a plurality of records, and each of the records includes a target data field.

The second obtaining module 42 is configured to obtain an index number of each target data field according to the records respectively.

Figure 12:
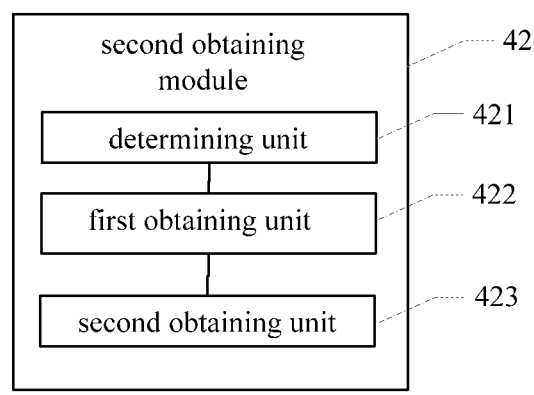
FIG. 12 is a block diagram of the second obtaining module in FIG. 10.

Referring to FIG. 12, in an exemplary embodiment, the second obtaining module 42 may include a determining unit 421, a first obtaining unit 422 and a second obtaining unit 423. The determining unit 421 is configured to determine whether the target data field is an unsigned int. If the target data field is an unsigned integer, the first obtaining unit 422 is configured to obtain the value of the target data field as the index number of the target data field. If the target data field is not an unsigned integer, the second obtaining unit 423 is configured to convert the value of the target data field into an unsigned integer, and obtain the converted value of the target data field as the index number of the target data field.

The third obtaining module 43 is configured to obtain a bitmap comprising a plurality of bitmap units, each bitmap unit having a unique index number.

In an exemplary embodiment, the third obtaining module 43 is configured to create a bitmap. A total number of the bitmap units in the bitmap are equal to or greater than a maximum possible number of the value of the target data field.

Figure 13:
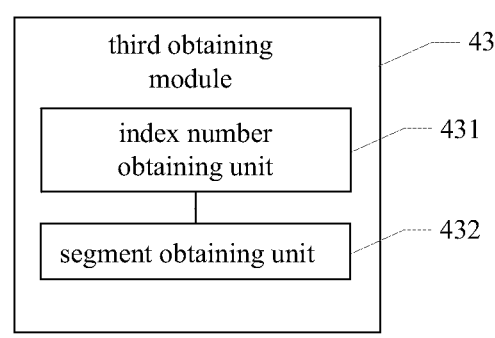
FIG. 13 is a block diagram of the third obtaining module in FIG. 10.

Referring to FIG. 13, in another exemplary embodiment, the third obtaining module 43 may include an index number obtaining unit 431, a segment obtaining unit 432.

The index number obtaining unit 431 is configured to according to the index number (N) of each target data field and a predetermined segment length (L), calculate a corresponding segment index number k, wherein k=round(N/L).

The segment obtaining unit 432 is configured to determine whether a bitmap segment having the segment index number k has been created. If the bitmap segment having the segment index number k has been created, the segment obtaining unit 432 is configured to obtain the bitmap segment having the segment index number k as the bitmap. If the bitmap segment not having the segment index number k has been created, the segment obtaining unit 432 is configured to create a bitmap segment within a predetermined space, mark a segment index number of the bitmap segment as k, and record a creation order index number of the bitmap segment as n.

The writing module 44 is configured to search and locate a bitmap unit in the bitmap, and write a predetermined data into the located bitmap unit, wherein the unique index number of the located bitmap unit corresponds to the index number of each target data field.

Figure 14:
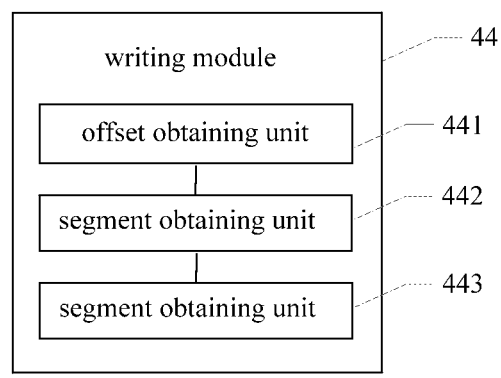
FIG. 14 is a block diagram of the writing module in FIG. 10.

Referring to FIG. 14, in an exemplary embodiment, the writing module 44 may include an offset obtaining unit 441, an address obtaining unit 442, and a writing unit 443.

The offset obtaining unit 441 is configured to according to the index number (N) of each target data field and the predetermined segment length (L), calculate an offset, wherein the offset=(N % L).

The address obtaining unit 442 is configured to obtain an address of the located bitmap unit by a formula: address=(S0+L*n+offset), wherein S0 is a starting address for the predetermined space.

The writing unit 443 is configured to according to the address of the located bitmap unit, write the predetermined data into the bitmap unit.

The statistics module 45 is configured to determine the bitmap unit having a same data with the predetermined data by traversing the bitmap, and count a total number of the determined bitmap units.

In the embodiment of the present disclosure, by writing a predetermined value into the located bitmap unit, determining the bitmap unit having a same data with the predetermined data by traversing the bitmap, and counting a total number of the determined bitmap units, the number of the unique values of the data collection can be obtained with less memory consumption and high efficiency. Especially, by mapping non unsigned integer values into unsigned integer values, target data field with various types can be statics.

Embodiments within the scope of the present disclosure may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. A "tangible" computer-readable medium expressly excludes software per se (not stored on a tangible medium) and a wireless, air interface. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that performs particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps. Program modules may also comprise any tangible computer-readable medium in connection with the various hardware computer components disclosed herein, when operating to perform a particular function based on the instructions of the program contained in the medium.

The above descriptions are only preferred embodiments of the present disclosure, and are not intended to limit the present disclosure. Any amendments, replacement and modification made to the above embodiments under the spirit and principle of the present disclosure should be included in the scope of the present disclosure.

What is claimed is:

1. A method for providing data statistics and reducing memory overflow in a computer, the computer comprising a processor operating in conjunction with a memory, the method comprising:
   obtaining a data collection from a server, wherein the data collection comprises a plurality of records, and each of the records comprise a target data field;
   obtaining an index number of each target data field according to the records respectively;
   obtaining a bitmap representing a bit sequence in the memory comprising a plurality of bitmap units, each bitmap unit having a unique index number stored in the memory, comprising:
      according to the index number (N) of each target data field and a predetermined segment length (L), calculating a corresponding segment index number k, wherein k=round (N/L), and the predetermined segment length (L) is a bit length of the bitmap units;
      determining whether a bitmap segment having the segment index number k has been created; and
      obtaining or creating the bitmap segment;
   searching and locating a bitmap unit in the bitmap, and writing a predetermined data into the located bitmap unit in the memory, wherein the unique index number of the located bitmap unit corresponds to the index number of each target data field;
   wherein the predetermined data comprises one and zero;
      when using zero as the predetermined data, setting all of the bits in the bitmap units of the bitmap to one before using the bitmap, and when the bitmap unit having a unique index number same with the index number of one of target data fields is located, writing zero into the located bitmap unit; and
      when using one as the predetermined data, setting all of the bits in the bitmap units of the bitmap to zero before using the bitmap, and when the bitmap unit having a unique index number same with the index number of one of target data fields is located, writing one into the located bitmap unit; and
   determining the bitmap unit having a same data with the predetermined data by traversing the bitmap, and counting a total number of the determined bitmap units to obtain a number of the unique index number of the data collection, such that memory overflow is reduced.

2. The method as claimed in claim 1, wherein, the step of obtaining an index number of each target data field according to the records respectively comprises: determining whether the target data field is an unsigned integer;
   if the target data field is an unsigned integer, obtaining the value of the target data field as the index number of the target data field; otherwise,
   converting the value of the target data field into an unsigned integer, and obtaining the converted value of the target data field as the index number of the target data field.

3. The method as claimed in claim 1, wherein, the step of obtaining the bitmap comprises:
   creating a bitmap, wherein a total number of the bitmap units in the bitmap is equal to or greater than a maximum possible number of the value of the target data field.

4. The method as claimed in claim 1, wherein, the step of obtaining or creating the bitmap segment further comprises:
   when the bitmap segment having the segment index number k has been created, obtaining the bitmap segment having the segment index number k as the bitmap; and
   when the bitmap segment having the segment index number k has not been created, creating a bitmap segment within a predetermined space, marking a segment index number of the bitmap segment as k, and recording a creation order index number of the bitmap segment as n.

5. The method as claimed in claim 4, wherein, the step of searching and locating a bitmap unit in the bitmap, and writing a predetermined data into the located bitmap unit comprises:
   according to the index number (N) of each target data field and the predetermined segment length (L), calculating an offset, wherein the offset=(N % L);
   obtaining an address of the located bitmap unit by a formula: address=(S0+L*n+offset), wherein S0 is a starting address for the predetermined space; and
   according to the address of the located bitmap unit, writing the predetermined data into the bitmap unit.

6. A device for providing data statistics and reducing memory overflow in a computer, the device comprises:
   a processor;
   a memory coupled to the processor; and
   a plurality of program modules stored in the memory to be executed by the processor, the plurality of program modules comprises:
      a first obtaining module, configured to obtain a data collection from a server, wherein the data collection comprises a plurality of records, and each of the records comprise a target data field;
      a second obtaining module, configured to obtain an index number of each target data field according to the records respectively;
      a third obtaining module, configured to obtain a bitmap representing a bit sequence in the memory comprising a plurality of bitmap units, each bitmap unit having a unique index number stored in the memory, wherein the third obtaining module comprises:
         an index number obtaining unit, configured to according to the index number (N) of each target data field and a predetermined segment length (L), calculate a corresponding segment index number k, wherein k=round (N/L), and the predetermined segment length (L) is a bit length of the bitmap units; and
         a segment obtaining unit, configured to determine whether a bitmap segment having the segment index number k has been created, and create or obtain the bitmap segment;

a writing module, configured to search and locate a bitmap unit in the bitmap, and write a predetermined data into the located bitmap unit, wherein the unique index number of the located bitmap unit corresponds to the index number of each target data field;

wherein the predetermined data comprises one and zero;

when using zero as the predetermined data, setting all of the bits in the bitmap units of the bitmap to one before using the bitmap, and when the bitmap unit having a unique index number same with the index number of one of target data fields is located, writing zero into the located bitmap unit; and when using one as the predetermined data, setting all of the bits in the bitmap units of the bitmap to zero before using the bitmap, and when the bitmap unit having a unique index number same with the index number of one of target data fields is located, writing one into the located bitmap unit; and a statistics module, configured to determine the bitmap unit having a same data with the predetermined data by traversing the bitmap, and count a total number of the determined bitmap units to obtain a number of the unique index number of the data collection, such that memory overflow is reduced.

7. The device as claimed in claim 6, wherein, the second obtaining module comprises:

a determining unit, configured to determine whether is target data field is an unsigned integer;

a first obtaining unit, if the target data field is an unsigned integer, configured to obtain the value of the target data field as the index number of the target data field;

a second obtaining unit, if the target data field is not an unsigned integer, configured to convert the value of the target data field into an unsigned integer, and obtain the converted value of the target data field as the index number of the target data field.

8. The device as claimed in claim 6, wherein, the third obtaining module configured to create a bitmap, wherein a total number of the bitmap units in the bitmap is equal to or greater than a maximum possible number of the value of the target data field.

9. The device as claimed in claim 6, wherein, the segment obtaining unit is further configured to:

when the bitmap segment having the segment index number k has been created, obtain the bitmap segment having the segment index number k as the bitmap, when the bitmap segment not having the segment index number k has been created, create a bitmap segment within a predetermined space, mark a segment index number of the bitmap segment as k, and record a creation order index number of the bitmap segment as n.

10. The device as claimed in claim 9, wherein, the writing module comprises:

an offset obtaining unit, configured to according to the index number (N) of each target data field and the predetermined segment length (L), calculate an offset, wherein the offset=(N % L);

an address obtaining unit, configured to obtain an address of the located bitmap unit by a formula: address=(S0+ L*n+offset), wherein S0 is a starting address for the predetermined space; and a writing unit, configured to according to the address of the located bitmap unit, write the predetermined data into the bitmap unit.

11. A non-transitory computer-readable storage medium storing instructions for providing data statistics and reducing memory overflow in a computer, the computer comprising a processor operating in conjunction with a memory, the instructions comprising:

obtaining a data collection from a server, wherein the data collection comprises a plurality of records, and each of the records comprise a target data field;

obtaining an index number of each target data field according to the records respectively;

obtaining a bitmap representing a bit sequence in the memory comprising a plurality of bitmap units, each bitmap unit having a unique index number, comprising:

according to the index number (N) of each target data field and a predetermined segment length (L), calculating a corresponding segment index number k, wherein k=round (N/L), and the predetermined segment length (L) is a bit length of the bitmap units;

determining whether a bitmap segment having the segment index number k has been created; and obtaining or creating the bitmap segment;

searching and locating a bitmap unit in the bitmap, and writing a predetermined data into the located bitmap unit in the memory, wherein the unique index number of the located bitmap unit corresponds to the index number of each target data field;

wherein the predetermined data comprises one and zero;

when using zero as the predetermined data, setting all of the bits in the bitmap units of the bitmap to one before using the bitmap, and when the bitmap unit having a unique index number same with the index number of one of target data fields is located, writing zero into the located bitmap unit; and when using one as the predetermined data, setting all of the bits in the bitmap units of the bitmap to zero before using the bitmap, and when the bitmap unit having a unique index number same with the index number of one of target data fields is located, writing one into the located bitmap unit; and determining the bitmap unit having a same data with the predetermined data by traversing the bitmap, and counting a total number of the determined bitmap units to obtain a number of the unique index number of the data collection, such that memory overflow is reduced.

12. The computer-readable storage medium as claimed in claim 11, wherein, the step of obtaining an index number of each target data field according to the records respectively comprises:

if the target data field is an unsigned integer, obtaining the value of the target data field as the index number of the target data field; otherwise, converting the value of the target data field into an unsigned integer, and obtaining the converted value of the target data field as the index number of the target data field.

13. The computer-readable storage medium as claimed in claim 11, wherein, the step of obtaining the bitmap comprises:

creating a bitmap, wherein a total number of the bitmap units in the bitmap is equal to or greater than a maximum possible number of the value of the target data field.

14. The computer-readable storage medium as claimed in claim 11, wherein, the step of obtaining or creating the bitmap segment further comprises:

when the bitmap segment having the segment index number k has been created, obtaining the bitmap segment having the segment index number k as the bitmap;

when the bitmap segment having the segment index number k has not been created, creating a bitmap segment within a predetermined space, marking a segment index number of the bitmap segment as k, and recording a creation order index number of the bitmap segment as n.

15. The computer-readable storage medium as claimed in claim 14, wherein, the step of writing a predetermined data into the located bitmap unit comprises:

according to the index number (N) of each target data field and the predetermined segment length (L), calculating an offset, wherein the offset=(N % L);

obtaining an address of the located bitmap unit by a formula: S0+L*n+offset corresponds to the index number of each target data field to be the following equation to obtain the index corresponding to the statistical data field bitmap unit: S0+L*n+offset, wherein S0 is a starting address for the predetermined space; and according to the address of the located bitmap unit, writing the predetermined data into the bitmap unit.

\* \* \* \* \*